United States Patent [19]

Irby et al.

[11] Patent Number: 4,986,511
[45] Date of Patent: Jan. 22, 1991

[54] SEAL STRUCTURE FOR ELEVATED TEMPERATURE SERVICE

[75] Inventors: Richard E. Irby, Duncanville; G. Stephen Kyker, Fort Worth; Lorenzo P. DiSano, Kingwood; Eduardo Alvarez, Houston, all of Tex.

[73] Assignees: Dresser Industries, Inc., Dallas; Hoechst Celanese Corporation, Houston, both of Tex.; a part interest

[21] Appl. No.: 450,622

[22] Filed: Dec. 14, 1989

[51] Int. Cl.$^5$ .............................................. E21B 33/00
[52] U.S. Cl. ...................................... 251/1.3; 251/1.1; 277/116.2; 277/DIG. 6
[58] Field of Search ................... 251/1.1, 1.3; 277/110, 277/116.2, 123, 188 R, DIG. 6

[56] References Cited

U.S. PATENT DOCUMENTS

| | | | |
|---|---|---|---|
| 3,904,212 | 9/1975 | Pugh et al. | 277/126 |
| 4,219,204 | 8/1980 | Pippert | 277/188 A |
| 4,363,465 | 12/1982 | Morrill | 277/DIG. 6 X |
| 4,372,527 | 2/1983 | Rosenhauch et al. | 251/1 A |
| 4,795,166 | 1/1989 | Sumber | 277/DIG. 6 X |
| 4,814,530 | 3/1989 | Ward et al. | 528/342 |

Primary Examiner—John C. Fox

[57] ABSTRACT

A seal comprises a sandwich of a soft, low modulus resinous layer between two outer layers of harder, high modulus resinous material to provide an effectve high pressure seal at both low and high temperatures. The seal can be used in well head service, e.g., in a blowout preventer or stuffing box seal, in oil wells, geothermal wells of hydraulic mining pipes. The high modulus material is preferably a polybenzimidazole containing 5 to 50 wt. % short fibers. The low modulus material is preferably a thermoplastic fluorinated hydrocarbon polymer or a fluorinated synthetic elastomer containing polybenzimidazole in powder and/or short fiber form and short fibers of glass and/or carbon. For blowout preventer service, the seal can take the form of a T to be fitted with complementary metal retainers to form a cylindrical seal unit having a semicylindrical groove in the seal face to mate with the polish rod or tubing.

36 Claims, 2 Drawing Sheets

SEAL STRUCTURE FOR ELEVATED TEMPERATURE SERVICE

FIELD OF THE INVENTION

This invention relates generally to pressure seals. In one aspect the invention relates to a multi-component seal wherein at least one component is formed of a high hardness, high modulus material while at least one other component is formed of a softer, lower modulus material. In another aspect the invention relates to a blowout preventer such as may be used on an oil or gas well to contain fluids within the well. In a further aspect the invention relates to a multi-component seal which functions at high pressures, both at elevated temperatures and at lower temperatures.

BACKGROUND OF THE INVENTION

As used in the well drilling, servicing and producing industry, a blowout preventer is a device which can be attached to a well casing to seal off the annular space between the casing and a polish rod or tubing within the casing so as to contain and control the flow of liquids and/or gases under the pressurized conditions that may be encountered when drilling, operating or servicing the well. Similarly, the device can be attached to a well tubing to seal off the annular space between the tubing and a polish rod or smaller tubing within the first tubing. A conventional type of blowout preventer comprises a housing with a pair of opposing rams mounted in opposite sides of the housing for movement toward or away from each other inside of the housing. The rams can be activated in any suitable manner, either manually or automatically. Sealing blocks are removably connected to the ends of the rams within the housing. The sealing blocks are suitably sized and shaped to engage and seal against the rod or tubing extending coaxially with the well casing or tubing as well as seal against the interior surface of the well casing or tubing. When there is no rod or small tubing within the well casing or tubing, the seals may also be designed to meet fully, without leaving a cylindrical opening therethrough, and thereby seal off the entire top of the well casing or large tubing.

In some environments, the blowout preventer must be able to effect and maintain a seal at elevated temperatures as well as at high pressures. One blowout preventer used commercially for high temperature, high pressure environments employs ram seal elements formed from a composite of asbestos cloth impregnated with low molecular weight suspension grade polytetrafluoroethane. While this blowout preventer performs satisfactorily at moderate conditions such as below 575° F. and 1500 psig, problems can be encountered at more severe conditions. At temperatures in excess of 600° F., which are encountered in some steam injection wells and in some geothermal wells, the polytetrafluoroethylene tends to decompose to fluorocarbon gas, leaving a soggy mass of asbestos fibers and partially decomposed polymer. In addition to possible environmental problems relating to asbestos fibers and fluorocarbon gases, the loss of the seal can result in severe damage to the well and related equipment.

Accordingly, it is an object of the invention to provide a new and improved seal structure. It is an object of the invention to provide a seal which maintains its integrity at elevated temperatures. Another object of the invention is to provide a seal structure which provides an effective seal at lower temperatures as well as at elevated temperatures. A further object of the invention is to provide a seal structure which will reseal after being exposed to elevated temperatures under sealing conditions and then opened and cooled to lower temperature conditions.

SUMMARY OF THE INVENTION

A seal structure which is suitable for use in well head seals for operation at high pressures and elevated temperatures comprises a lower temperature seal layer positioned between two high temperature seal layers. The high temperature seal layers can have a compressive modulus of elasticity at 7220 F. (ASTM D695-85) in the range of about 500,000 psi to about 2,500,000 psi, a coefficient of linear thermal expansion in the range of about $10 \times 10^{-6}$ to about $20 \times 10^{-6}$ in/in/°F. for the temperature range of about 75° to 300° F., and a Rockwell A hardness in the range of about 55 to about 65. The lower temperature seal layer can have a compressive modulus of elasticity at 72° F. in the range of about 25,000 to about 250,000 psi, a coefficient of linear thermal expansion in the range of about $5 \times 10^{-5}$ to about $10 \times 10^{-5}$ in/in/°F. for the temperature 300° F., and a Shore D hardness in the range of about 50 to about 80.

The high temperature seal layers preferably contain at least 40 wt. % polybenzimidazole and from about 15 to about 50 weight percent fibers. The lower temperature seal layer preferably contains at least 50 wt. % thermoplastic polymer of fluorinated hydrocarbons or fluorinated synthetic elastomer. The presently preferred molding composition for the lower temperature seal layer comprises 50 to 95 wt. % fluorinated elastomeric copolymer, 5 to 50 wt. % polybenzimidazole in the form of powder and/or fibers, and 0 to 35 wt. % glass fibers, carbon fibers and/or aramid fibers.

The lower temperature seal layer can be in the form of a T while each of the high temperature seal layers can have a complementary L shape to form part of a cylindrical structure. A discoidal end layer formed of the material of the high temperature seal layers can cap the T. Upper and lower metal retainers and a metal end plate can be added to complete the cylindrical shape of a ram seal unit for a blowout preventer.

DETAILED DESCRIPTION

Figure 1:
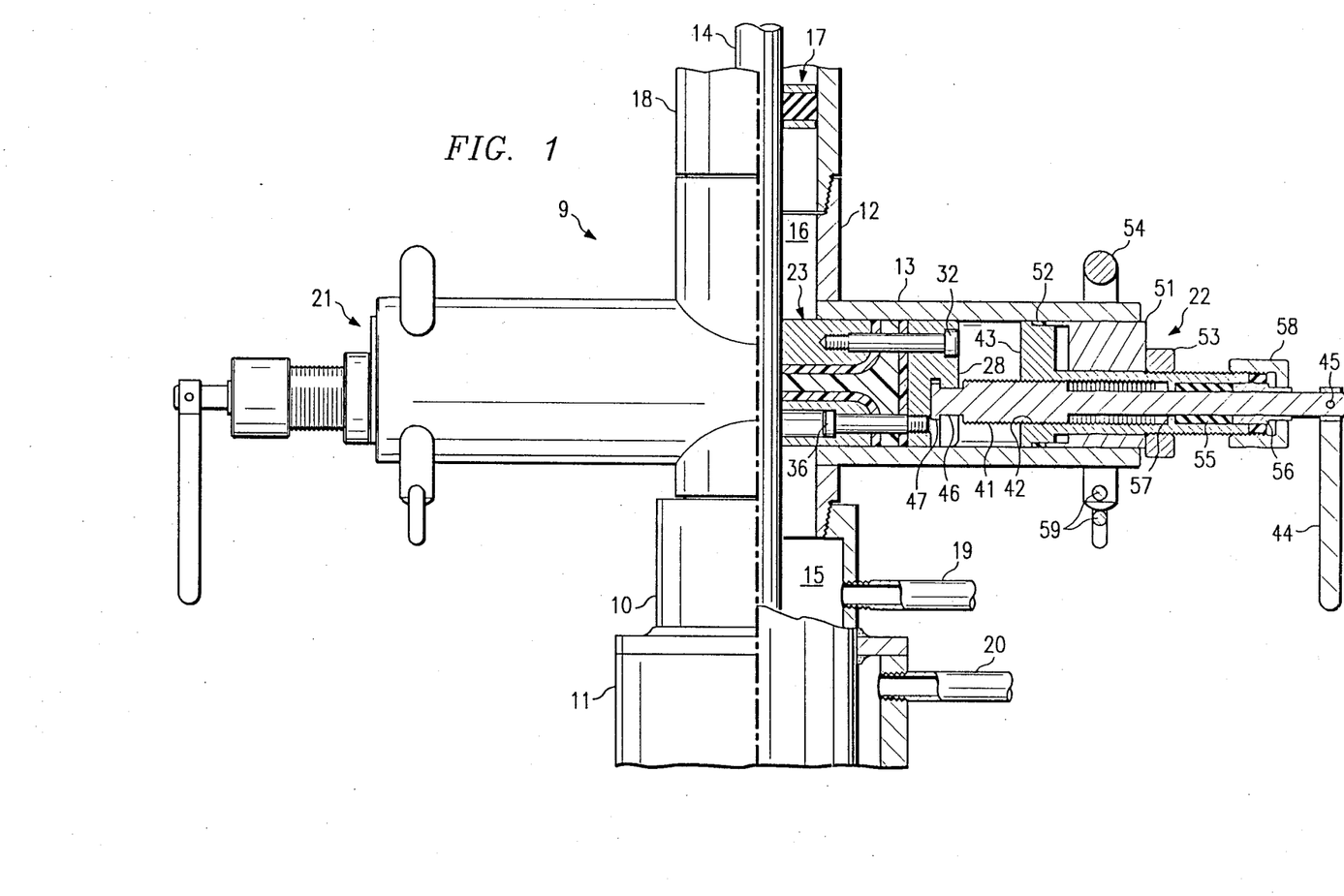
FIG. 1 is an elevational view, partly in cross-section, of a blowout preventer mounted on a tubing which is positioned within a well casing.

Referring now to FIG. 1, the blowout preventer 9 is mounted on the upper end of production tubing 10 which extends downwardly into the earth to a subterranean formation of interest. The production tubing 10 can be positioned coaxially within well casing 11. The blowout preventer 9 has a vertically extending tubular member or pipe 12 and a horizontally extending member 13 which intersects tubular member 12 at right angles to form a cross. Each of tubular members 12 and 13 and polished rod 14 has a circular cross-section in a plane perpendicular to the respective longitudinal axis. Polished rod 14 is positioned within the bore 15 of production tubing 10, extends coaxially through the bore 16 of tubular member 12, and exits through a stuffing box 17 in conduit 18. The annular stuffing box 17 can provide a fluid seal between polished rod 14 and conduit 18. A conduit 19 is connected to production tubing 10 at a point below blowout preventer 9 to provide fluid communication with the annular chamber 15 between rod 14 and tubular member 10. A conduit 20 is connected to well casing 11 to provide fluid communication with the annular chamber between production tubing 10 and well casing 11. Left and right ram actuation units 21 and 22 are mounted in opposite ends of tubular member 13 to provide for reciprocal motion of the ram seal units along a horizontal line which intersects the longitudinal axis of rod 14 at right angles thereto. As the left and right ram seal units and ram activating units are identical, only the right ram seal unit and right ram activating unit will be described.

Figure 2:
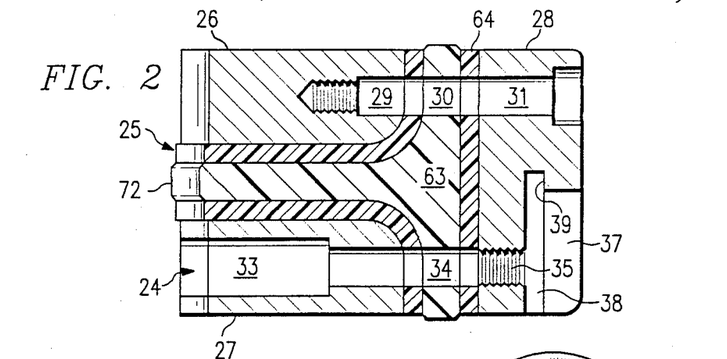
FIG. 2 is a vertical cross-sectional view of the right hand ram seal unit of the blowout preventer of FIG. 1, the left hand ram seal unit being identical thereto.
Figure 3:
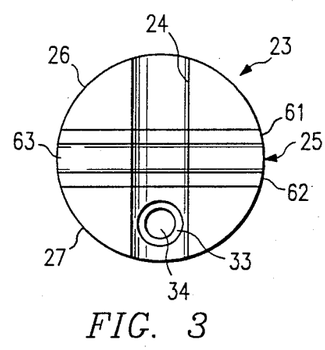
FIG. 3 is an elevational view of the sealing face of the ram seal unit of FIG. 2.
Figure 4:
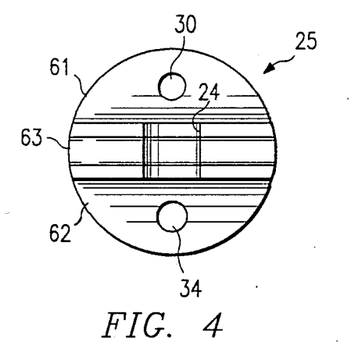
FIG. 4 is an elevational view of the sealing face of the seal structure from the ram seal unit of FIG. 3.
Figure 5:
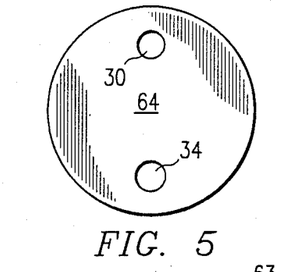
FIG. 5 is an elevational view of the end of the seal structure of FIG. 4 opposite the sealing face.
Figure 6:
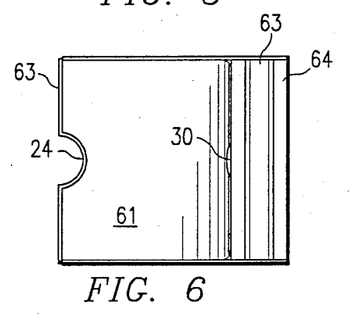
FIG. 6 is a plan view of the seal structure of FIG. 4.
Figure 7:
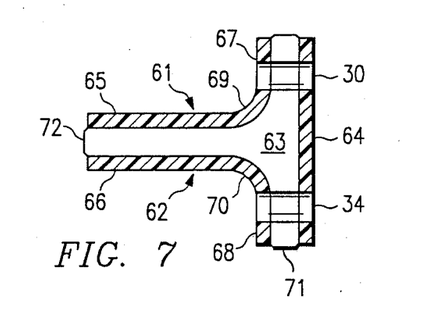
FIG. 7 is a side elevational view of the seal structure of FIG. 4.

Referring now to FIGS. 1, 2 and 3, the right ram seal unit 23 has a generally cylindrical configuration with a horizontal longitudinal axis and with a semicylindrical groove 24 in the sealing face end. Groove 24 corresponds at least generally to the external configuration of half of the laterally adjacent portion of rod 14 such that when both ram seal units are in the closed position, they sealingly engage rod 14 in the two mating grooves 24. Ram seal unit 23 comprises a generally T-shaped composite seal structure 25, a top retainer plate 26, a bottom retainer plate 27 and a ram back plate 28. The longitudinally extending surfaces of elements 25, 26, 27 and 28 which form part of the exterior of ram seal unit 23 are of cylindrical nature. Top retainer plate 26, seal structure 25 and back plate 28 have holes 29, 30 and 31 in coaxial alignment, with hole 29 being threaded, to receive top shoulder screw 32 for securing the three elements together. Bottom retainer plate 27, seal structure 25 and back plate 28 have holes 33, 34 and 35 in coaxial alignment, with hole 35 being threaded, to receive bottom shoulder screw 36. Plates 26, 27 and 28 are usually formed of metal to assist seal structure 25 to retain its shape under the high pressure conditions encountered in bore 15 as well as the compression applied by ram activating unit 22.

Back plate 28 also has an opening 37 in its rear face, in communication with an internal recess opening 38 to form an internal shoulder 39. A threaded portion of feed screw 41 extends in threaded engagement through a threaded opening 42 in feed screw housing 43. The yoke end of feed screw handle 44 is pivotably connected to the unthreaded outer end of screw 41 by pin 45. At the inner end of feed screw 41, an unthreaded neck portion 46 of reduced diameter connects the inner unthreaded end or head portion 47 to the threaded portion. Feed screw 41 is positioned in housing 43 such that the neck side of head portion 47 can butt against shoulder 39. An operator can use handle 44 to rotate feed screw 41 in either direction, with the threaded engagement of feed screw 41 and housing 43 resulting in the axial motion of feed screw 41 toward the rod 14, thereby closing the ram seal unit 23 against the rod 14, or away from rod 14, thereby withdrawing the ram seal unit 23 from contact with rod 14.

The ram activating unit 22 is provided with an end plate 51 having an opening therethrough for a reduced diameter portion of housing 43. At least one annular packing ring 52 extends circumferentially about an intermediate diameter portion of housing 43 and in contact with the interior surface of tubular member 13. A packing nut 53 is threadedly engaged on an externally threaded axially extending reduced diameter portion of housing 43. A U-shaped yoke 54 extends through openings in tubular member 13 and end plate 51 to immobilize end plate 51 in tubular member 13. Tightening nut 53 on housing 43 against end plate 51 causes the enlarged diameter portion of housing 43 to compress the packing ring 52 against end plate 51, thereby providing a pressure seal between the interior of tubular member 13 and the outside environment. Similarly, annular packing 55 is positioned circumferentially about an unthreaded portion of feed screw 41 between a packing retainer ring 56 and a radially inwardly extending annular shoulder 57 in housing 43. Ring 56 is held in place by packing nut 58 which is in threaded engagement with the externally threaded outer end of housing 43. Tightening packing nut 58 compresses packing 55 to provide a pressure seal between the interior of housing 43 and the outside environment. A yoke retainer pin 59 extends through the ends of yoke 54 to releasably secure yoke 54 in place.

Referring now to FIGS. 2-7, the composite seal unit 25 comprises a generally L-shaped upper layer 61, a generally L-shaped lower layer 62, a generally T-shaped central layer 63 and a discoidal rear end layer 64. Each of layers 61 and 62 is an L-shaped segment of less than a half of the solid cylinder represented by the entire ram seal unit 23 and can be identical to each other. Each of layers 61 and 62 has a first planar leg portion 65 or 66 which is at least generally parallel to the longitudinal axis of ram seal unit 23, a second planar leg portion 67 or 68 which is at least substantially perpendicular to the longitudinal axis of ram seal unit 23, and a curved center portion 69 or 70 connected between the two leg portions. The curvature of the central portions can be substantially that of a cylinder to which the leg portions are tangent. The generally T-shaped central layer 63 is preferably symmetrical about the plane, through the longitudinal axis of the ram seal unit, which is perpendicular to the longitudinal axis of groove 24. The non-exterior outer surfaces of central layer 63 correspond to and mate with the interior surfaces of layers 61, 62 and 64. The diameter of the discoidal portion 71 of central layer 63, which is perpendicular to the longitudinal axis of ram seal unit 23, can be slightly larger than the diameter of the discoidal rear end layer 64 and the corresponding outer diameter of the discoidal ring represented by the outer cylindrical surfaces of legs 67 and 68. The sealing face end portion 72 of central layer 63 also can extend beyond the sealing face ends of layers 61 and 62. These protrusions of central layer 63 permit greater conformance of the softer, more resilient material of central layer 63 to the surface it abuts in sealing relationship. The edges of the protruding portions of central layer 63 are preferably chamfered.

Central layer 63 is formed of a soft, relatively resilient material which can provide effective sealing action at relatively low temperatures, while layers 61, 62 and 64 are formed of a harder, less resilient material which can provide effective sealing action at elevated temperatures and pressures, e.g., up to about 700° F. at up to about 3000 psi.

In general it is desirable that the material for layers 61, 62 and 64 exhibit a compressive modulus of elasticity at 72° F. (ASTM D 695-85) in the range of about 500,000 psi to about 2,500,000 psi, with values in the range of about 600,000 psi to 1,100,000 psi being preferred; a coefficient of linear thermal expansion (thermal mechanical analysis) in the range of about $10 \times 10^{-6}$ to about $20 \times 10^{-6}$ in/in/°F. for the temperature range of 75° to 300°F. and in the range of about $10 \times 10^{-6}$ to about $25 \times 10^{-6}$ in/in/°F. for the temperature range of 390° to 570° F.; and a Rockwell A hardness in the range of about 55 to about 65. For service above 500° F., it is desirable that the compressive modulus of elasticity for layers 61, 62 and 64 be at least 180,000 psi at 550° F. and at least 100,000 at 650° F. For service only below 500° F., the material should have a suitable compressive modulus of elasticity at the desired operating temperatures.

In general it is desirable that the material for central layer 63 exhibit a compressive modulus of elasticity at 72° F. (ASTM D 695-85) in the range of about 25,000 psi to about 250,000 psi, with values in the range of about 100,000 psi to about 200,000 psi being preferred; a coefficient of linear thermal expansion (thermal mechanical analysis) in the range of about $5 \times 10^{-5}$ to about $10 \times 10^{-5}$ in/in/°F. for the temperature range of 75° to 300° F. and in the range of about $7 \times 10^{-5}$ to about $12 \times 10^{-5}$ in/in/°F. for the temperature range of 300° to 400° F.; and a Shore D hardness in the range of about 50 to about 80.

While any suitable material can be employed for the high temperature seal elements 61, 62 and 64, it is presently preferred that these elements be formed from at least one polybenzimidazole. The polybenzimidazoles can be prepared, for example, by melt polymerizing an aromatic tetraamine and a diphenylester or an anhydride of an aromatic or heterocyclic dicarboxylic acid in a one or two stage process. Polybenzimidazoles can also be prepared from the free dicarboxylic acids or the methyl esters of such acids, rather than the phenyl esters or anhydrides, in a melt polymerization process. The presently preferred polybenzimidazoles have repeating units of the following formula:

wherein R is a tetravalent aromatic nucleus with the nitrogen atoms forming the benzimidazole rings being paired upon adjacent carbon atoms of the aromatic nucleus, and R' is an aromatic ring, an alkaline group, or a heterocyclic ring such as pyridine, pyrazine, furan, quinoline, thiophene and pyran. The presently preferred polybenzimidazole is poly-2,2'-(m-phenylene)-5,5'-bibenzimidazole.

While the polybenzimidazole resin can be molded in any suitable manner, the presently preferred technique is the sintering process disclosed in Ward et al., U.S. Pat. No. 4,814,530, which is incorporated herein by reference. Typical properties for elements molded from an unfilled, virgin poly-2,2'-(m-phenylene)-5,5'-bi-benzimidazole sold by PBI Products Division of Hoechst Celanese Corporation under the trademark CELAZOLE U-60, include a tensile strength (ASTM D638) of 23,000 psi, a tensile modulus (ASTM D638) of 850,000 psi, a compressive strength (ASTM D695) of 50,000 psi at 10% strain, a flexural strength (ASTM D790) of 32,000 psi, a flexural modulus of elasticity (ASTM D790) of 950,000 psi, a coefficient of linear thermal expansion of $13 \times 10^{-6}$ in/in/°F. for the temperature range of 75° to 300° F. and $18 \times 10^{-6}$ in/in/° F. for the temperature range of 390° to 570° F., a Shore D hardness of 99, a Rockwell A hardness in the range of about 55 to about 65, a compressive modulus of elasticity (ASTM D695) of 900,000 psi at room temperature, 500,000 psi at 550° F. and 350,000 psi at 650° F.

Other suitable resins can be blended with the polybenzimidazoles, but it is desirable that the polybenzimidazoles constitute a least about 40 wt. %, preferably at least about 50 wt. % and more preferably at least about 60 wt. %, of the total molding composition employed for the formation of high temperature seal elements 61, 62 and 64. Non-resin additives can also be employed in the molding composition for the high temperature seal elements, and will generally constitute less than 50 wt. %, preferably less than 45 wt. % and more preferably less than 40 wt. %, of the total molding composition.

Suitable blending resins include high molecular weight thermoplastic homopolymers and copolymers based on fluorinated hydrocarbons and the fluorinated synthetic elastomers. The fluorinated hydrocarbons will generally have from 2 to 10 carbon atoms per molecule and are preferably fully fluorinated, with examples including chlorotrifluoroethylene, tetrafluoroethylene, hexafluoropropylene, octafluorobutenes, perfluorohexenes, perfluorodecenes, and the like, and mixtures of any two or more thereof. The presently preferred thermoplastic materials are high molecular weight polymers consisting essentially of recurring monomer units having the formula ($CF_2$—$CF_2$), e.g fluoroethylene with a mean average molecular weight in the range of about 5 million to about 10 million.

The fluorinated synthetic elastomers include the fluorocarbons, the fluorosilicones and the fuoroalkoxyphosphazenes, with the fluorocarbon elastomers being preferred over the fluorosilicones and fluoroalkoxyphosphazenes for service at temperatures of 450° F. and higher. The fluorocarbon elastomers are generally copolymers of fluorinated olefinic hydrocarbons having 2 to 10 carbon atoms per molecule, and/or fluorinated alkyl vinyl ethers having 3 to 10 carbon atoms per molecule. Olefinic hydrocarbons having 2 to 10 carbon atoms per molecule can be employed as comonomers in the formation of the fluoroelastomers. Examples of fluorocarbon elastomers include copolymers of vinylidene fluoride and hexafluoropropylene; copolymers of vinylidene fluoride, hexafluoropropylene and tetrafluoroethylene; copolymers of vinylidene fluoride, tetrafluoroethylene and perfluoromethyl vinyl ether; copolymers of tetrafluoroethylene and perfluoromethyl vinyl ether; copolymers of vinylidene fluoride and chlorotrifluoroethylene; copolymers of vinylidene fluoride and 1-hydropentafluoropropylene; copolymers of vinylidene fluoride, 1-hydropentafluoropropylene and tetrafluoroethylene; copolymers of vinylidene fluoride and chlorotrifluoroethylene; and copolymers of propylene and tetrafluoroethylene. The presently preferred fluoroelastomer is a copolymer, having a mean average molecular weight in the range of about 150,000 to about 300,000, of tetrafluoroethylene and perfluorinated vinyl ether of the formula $CF_2=CF-OR$ wherein R is a perfluoroalkyl group having from 1 to 4 carbon atoms.

Other polymeric materials which can be blended with the polybenzimidazoles include the aromatic polyimides, the polyarylene ketones, the aromatic polyesters, the aromatic polyamides and the poly(arylene sulfides). Preferably at least about 50% of the linkages, and more preferably at least 85% of the linkages contain aromatic groups. The wholly aromatic polyimides generally have greater heat resistance than polyimides containing a significant number of aliphatic linkages, and thus are preferred for high temperature environments. Similarly, the aromatic polyamides are preferably aromatic in both the diamine units and the dibasic unit in at least 85% of the amide linkages, as such polymers have much greater thermal stability than aliphatic-aromatic polyamides or aliphatic-aliphatic polyamides. Suitable polymers include polyimides, polyamide-imides, polyether-imides, polyimidesulfones, polyetherketones, polyetheretherketones, polyetheretherketoneketone, polyetherketoneketones, poly(phenylene sulfide), polysulfone, and polyethersulfone, and mixtures of any two or more thereof.

The inclusion of viscoelastic modifier fibers to reduce polymer flow under heat and pressure is considered to be advantageous, particularly when the length of such fibers is in the range of about 1/32" to about 3" and the diameter of the fibers is in the range of about 50 to about 300 microns. The presently preferred length of such staple fibers is in the range of about 1/32" to about ¼". However, it is also possible to use continuous filaments instead of or in addition to the staple fibers. While any suitable fiber could be utilized, glass fibers, carbon fibers, aramid fibers, and sulfonated polybenzimidazole fibers are generally preferred. Carbon fibers with a tensile modulus in the range of about 20 million to about 60 million psi, a density in the range of about 0.06 to about 0.08 pound per cubic inch, a nominal length in the range of about 1/32" to about 3", preferably in the range of about 1/32" to about ¼", and a diameter of less than about 140 microns are useful. The sulfonated polybenzimidazole fibers will generally have a nominal length in the range of about 1/32" to about 3", preferably in the range of about 1/32" to about ¼", with a diameter in the range of about 50 to about 300 microns. The length of the aramid fibers will generally be in the range of about 1/32" to about 3", preferably in the range of about 1/32" to about ¼". The presently preferred fibers are floccular milled fibers of E glass, a soda lime type glass, having a nominal length of ⅛" with the actual length ranging from 1/32" to ¼", a diameter of about 140 microns, and being at least substantially free of any finish or sizing agents. The glass fibers can be treated with any thermally stable coupling agent to improve cohesion with the resin, e.g., a triorgano functional or tetraorgano functional coupling agent based on titanium, silicon, and/or zirconium. When employed, the concentration of fibers in the molding composition will generally be in the range of about 15 to about 50 wt. % of the total molding composition, and preferably will be in the range of about 30 to 35 wt. % of the total molding composition for the high temperature seal elements. Other additives which can be employed include mineral fillers and thermal stabilizers.

While any suitable material can be employed for the central layer 63, the polymers of fluorinated monomers are considered to be particularly advantageous. These include high molecular weight thermoplastic homopolymers and copolymers based on fluorinated olefinic hydrocarbons. The fluorinated olefinic hydrocarbons will generally have from 2 to 10 carbon atoms per mol and are preferably fully fluorinated. Examples include chlorotrifluoroethylene, tetrafluoro-ethylene, hexafluoropropylene, octafluorobutenes, perfluorohexenes, and the like, and mixtures of any two or more thereof. The presently preferred thermoplastic materials are high molecular weight polymers consisting essentially of recurring monomer units having the formula $(CF_2-CF_2)$, e.g., polytetrafluoroethylene with a mean average molecular weight in the range of about 5 million to about 10 million.

The fluorinated synthetic elastomers include the fluorocarbons, the fluorosilicones and the fluoroalkoxyphosphazenes, with the fluorocarbon elastomers being preferred over the fluorosilicones and fluoroalkoxyphosphazenes for service at temperatures of 450° F. and higher. The fluorocarbon elastomers are generally copolymers of fluorinated olefinic hydrocarbons having 2 to 10 carbon atoms per molecule, and/or fluorinated alkyl vinyl ethers having 3 to 10 carbon atoms per molecule. Olefinic hydrocarbons having 2 to 10 carbon atoms per molecule can be employed as comonomers in the formation of the fluoroelastomers. Examples of fluorocarbon elastomers include copolymers of vinylidene fluoride and hexafluoropropylene; copolymers of vinylidene fluoride, hexafluoropropylene and tetrafluoroethylene; copolymers of vinylidene fluoride, tetrafluoroethylene and perfluoromethyl vinyl ether; copolymers of tetrafluoroethylene and perfluoromethyl vinyl ether; copolymers of vinylidene fluoride and chlorotrifluoroethylene; copolymers of vinylidene fluoride and 1-hydropentafluoropropylene; copolymers of vinylidene fluoride, 1-hydropentafluoropropylene and tetrafluoroethylene; copolymers of vinylidene fluoride and chlorotrifluoroethylene; and copolymers of propylene and tetrafluoroethylene. The presently preferred fluoroelastomer is a copolymer, having a mean average molecular weight in the range of about 150,000 to about 300,000, of tetrafluoroethylene and perfluorinated vinyl ether of the formula $CF_2=CF-OR$ wherein R is a perfluoroalkyl group having from 1 to 4 carbon atoms.

Polybenzimidazoles can be blended, preferably in powder and/or fiber form, with the fluorinated polymer to form the molding composition for central layer 63. The powdered polybenzimidazole will generally have a particle size in the range of about 5 to about 300 microns, preferably in the range of about 50 to about 150 microns. The polybenzimidazole fibers will preferably be sulfuric acid treated, with a length in the range of about 1/32" to ¼" and a diameter in the range of about 50 to about 300 microns.

Other polymeric materials which can be blended with the polymers of fluorinated monomers to form the central layer 63 include the aromatic polyimides, the polyarylene ketones, the aromatic polyesters, the aromatic polyamides and the poly(arylene sulfides). Preferably at least about 50% of the linkages, and more preferably at least 85% of the linkages contain aromatic groups. The wholly aromatic polyimides generally have greater heat resistance than polyimides containing a significant number of aliphatic linkages, and thus are preferred for high temperature environments. Similarly, the aromatic polyamides are preferably aromatic in both the diamine units and the dibasic unit in at least 85% of the amide linkages. Suitable polymers include polyimides, polyamide-imides, polyether-imides, polyimidesulfones, polyetherketones, polyetheretherketones, polyetheretherketoneketone, polyetherketoneketones, poly(phenylene sulfide), polysulfone, and polyethersulfone, and mixtures of any two or more thereof.

While any suitable resin can be blended with the polymer of fluorinated monomer to form the central layer 63, the fluorinated polymers will generally comprise at least about 40 wt. %, preferably at least about 50 wt. %, and more preferably at least about 60 wt. %, of the total molding composition employed by the formation of central layer 63. Non-resin additives can also be employed in the molding composition for central layer 63, and will generally constitute less than 50 wt. %, preferably less than 45 wt. %, and more preferably less than 40 wt. %, of the total molding composition for central layer 63.

The inclusion in the molding composition for central layer 63 of viscoelastic modifier fibers to provide dimensional stability under heat and pressure is particularly advantageous. Such fibers include the sulfonated poly-benzimidazole fibers, glass fibers, carbon fibers, aramid fibers, and mixtures of any two or more thereof. The glass fibers are preferably the floccular milled fibers of E glass, with a length in the range of about 1/32" to about ¼", a diameter in the range of about 50 to about 300 microns, and being at least substantially free of any finish or sizing agents. The glass fibers can be treated with any thermally stable coupling agent to improve the cohesion between the glass fibers and the resins. The preferred carbon fibers have a tensile modulus in the range of about 20 million to about 60 million psi, a density in the range of about 0.06 to about 0.08 pound per cubic inch, a nominal length in the range of about 1/32" to about ¼", and a diameter of less than about 140 microns. The molding composition can also contain other additives to enhance thermal and/or mechanical properties, such as mineral additives, thermal stabilizers, and compression strength enhancers. Presently preferred fillers include silica, alumina, silica-alumina, nickel, chromium, titanium carbide, and the like, and mixtures of any two or more thereof.

The presently preferred molding compositions for central layer 63 will generally contain:
  about 50 to 100 wt. % perfluoropolymer,
  0 to about 50 wt. % polybenzimidazole powder and/or fibers,
  0 to about 50 wt. % glass fibers, carbon fibers, and/or aramid fibers
  0 to about 10 wt. % mineral filler, and
  0 to about 10 wt. % thermal stabilizers; and more preferable will contain:
  about 60 to about 95 wt. % perfluoropolymer,
  about 5 to about 40 wt. % polybenzimidazole,
  0 to about 35 wt. % glass fibers, carbon fibers, and/or aramid fibers,
  about 0.01 to about 5 wt. % mineral fillers, and
  about 0.01 to about 5 wt. % thermal stabilizers.
The polybenzimidazole powders and/or fibers can be virgin resin, but the fibers are preferably sulfonated. The molding composition also desirably contains at least one organometallic coupling agent.

EXAMPLE I

Several candidates for use as seal materials were tested in a laboratory high temperature test fixture. The candidate material, in the form of an annular test seal element having inwardly converging frustoconical end surfaces, was placed between two retention rings, each having an outwardly diverging frustoconical end surface mating with an end surface of the test seal element. The seal element-rings assembly was placed over a cylindrical mandrel having an outer diameter corresponding to the inner diameters of the rings and seal element. The mandrel had an enlarged shoulder on which the lower ring rested. The mandrel was positioned coaxially within the annular wall of a reservoir having an internal diameter corresponding to the outer diameter of the test seal element. While the inner diameters of the test seal element and the retention rings were essentially the same, the outer diameters of the retention rings were slightly smaller than the outer diameter of the test seal element. A piston having an annular lower section extended through the upper end of the enclosed reservoir. The inner diameter of the annular lower section of the piston was larger than the diameter of the upper portion of the mandrel and smaller than the outer diameter of the retention rings, such that the piston applied downwardly directed force on the upper retention ring and the test seal element to compress the test seal element between the mandrel and the annular reservoir wall. Water was placed in the reservoir below the mandrel shoulder. A first pressure gauge communicated with the interior of the reservoir below the lower retention ring, while a second pressure gauge communicated with the interior of the reservoir above the upper retention ring. Each test seal element had an axial length of about 2.3 inches, an inner diameter of about 2.9 inches and an outer diameter of about 4 inches. The frustoconical surfaces were inclined at angles of 45° and 135° to the longitudinal axis of the test seal element.

The first test seal element was sinter molded from virgin polybenzimidazole. The lower portion of the reservoir was filled with water at 2500 psig. A downward force of 55,000 lbs. was applied to the piston while the test apparatus was maintained at 75° F. There was a slow water leak around the test seal element. Some of the water was removed, the reservoir was reclosed. The reservoir was maintained at 650° F. for 240 hours without any leakage of steam around the test seal element. After removal from the test apparatus, the test seal element was observed to have an axial crack which propagated from a chipped edge, but there had been no extrusion of the test seal element. Thus, this polybenzimidazole seal element served effectively as a seal at 650° F, but did not adequately seal at 75° F.

Two circumferential grooves were machined in the inner surface of the test seal element and one circumferential groove was machined in the outer surface of the test seal element. The thus modified test seal element was again pressure tested at 75° F., but a seal was not achieved.

The second test seal element was a blend of polybenzimidazole benzimidazole and polyether ketone. It held 2500 psig water at 75° F. with a 17,500 lb. force on the piston. However, the seal failed at 640° F. due to extrusion of the test seal element.

A third test seal element, formed of virgin polyetheretherketone, did not achieve pack-off even at 50,000 pounds of applied force at room temperature or at 200° F. At 325° F. and 50,000 pounds of applied force, there was a very large deflection of the seal element, and the pack-off held against 2,500 psi. However at 428° F. the seal started to leak and the elevated temperature test was discontinued.

A fourth test seal element, formed of polyetheretherketone, polytetrafluoroethylene, and carbon fibers, did not achieve pack-off at 30,000 pounds of applied force at 75° F., but did achieve a seal against 2,500 psi at 50,000 pounds of applied force at 75° F. The temperature was raised from 75° F. to 585° F. in slightly over three hours, and the test was discontinued after three and one half hours. The test seal element had completely extruded through the clearance gap.

A fifth test seal element, formed of 60 wt. % polytetrafluoroethylene and 40 wt. % graphite and supported with metal mesh backup, achieved a seal against 2,500 psi at 7,500 pounds of applied force at room temperature. The test seal element was then evaluated at 650° F. for 168 hours. The seal element failed the test as most of the test seal element had extruded through the metal mesh backup.

EXAMPLE II

Various candidates for use as blowout preventer seal materials were tested in a commercial size type T blowout preventer with 1¼" rams, for sealing performance in both cold and 650° F. steam environments. The blowout preventer was mounted on a water-steam reservoir in the form of a casing stub reservoir, which was 26" in length with a 4" I.D. The casing stub reservoir was provided with four band heaters operated by an Omega Model CN3P proportional temperature controller responsive to the temperature in the interior of the casing stub as measured by a type J thermocouple located just below the blowout preventer. The water-steam reservoir and blowout preventer were insulated with a ceramic fiber blanket. A Sprague pressure pump was connected to the casing stub reservoir via a conduit containing a valve, a pressure gauge, and another valve. A steam bleed conduit, containing a second pressure gauge and two valves, was connected to the blowout preventer above the rams. A polish rod extended downwardly through the blowout preventer.

A pair of ram seals was formed from a respective candidate material and the pair was installed in the blowout preventer. A predetermined amount of water was placed in the bottom of the casing stub reservoir. The rams were actuated to a closed position about the polish rod, the valves in the bleed conduit were closed, and the blowout preventer was pressure tested to 2500 psig at 75° F. The pressure gauge in the pump conduit, monitored by the pressure gauge in the pump conduit, while any leakage was detected by the pressure gauge in the bleed conduit. If a seal was achieved, the pressure was maintained for two hours by closing the valves in the pump conduit upstream of the pressure gauge.

For the elevated temperature test the temperature controller was activated to raise the temperature within the casing stub reservoir to the desired value and to hold it at that value within ±10° F. In the runs employing a steam soak, the valve downstream of the pump pressure gauge was opened and the other three valves were closed while 650° F. steam was maintained in the reservoir for the indicated time period with the blowout preventer rams in the open position. The rams were then closed and the top of the blowout preventer was opened to atmosphere and then reclosed. The reservoir was maintained at 650° F. and about 2250 psig for 72 hours, and any leakage was determined by the pressure gauge in the bleed line. If the blowout preventer passed this first cycle, the test assembly was cooled to 75° F. with the ram seals closed, the seals were retightened to compensate for thermal shrinkage, and the cycle was repeated two more times or until seal failure occurred. The description of the candidate ram seals and the test results are set forth in the following Table I.

TABLE 1

SIMULATED STEAM (650° F.) TESTS ON BOP SEAL MATERIALS

| TEST NUMBER | SEAL MATERIALS[4] | COLD SEAL AT °F. | | | STEAM SOAK ON OPEN SEALS | SEAL AT 650° F. (STEAM) | CONDITION OF SEALS AFTER TEST |
| --- | --- | --- | --- | --- | --- | --- | --- |
| | | 75 | 250 | 300 | | | |
| 1 | PBI | No | No | No | No | No test | Parts fractured and broke apart when removed |
| 2 | PBI | Yes[2] | — | — | No | No test | |
| 3 | PBI-A | No | No | No | No | No test | Parts fractured and broke apart when removed |
| 4 | PBI-B | No | No | — | No | No test | Cracked in middle[1] |
| 5 | PBI-B | No | No | — | No | No test | Cracked in middle[1] |
| 6 | PBI-B | No | No | — | No | No test | Cracked in middle[1] |
| 7 | PBI With PFP-A Tape Wrap | No | — | — | No | No test | PTFE tape torn from surface |
| 8 | PFP-B | No | — | — | 48 hours | 6 hours with no leakage, failed at 6 hours | Flowed good at edges and rear but failed due to minor extrusion at end next to polished rod |
| 9 | PBI Fabric Core/ PBI Backups | No | — | — | No | No test | Too porous, water flowed through seal |
| 10 | CG Core/PBI Backups | Yes | — | — | No | 36 Hrs. with no leakage | Backups cracked and broke apart; core showed limited flow |
| 11 | CG Core/PBI Backups | No | Yes | — | No | 168 hrs. with no leakage | Backups showed flow, Core looked good |
| 12 | PBI Backups With Core of CG and Nonwoven PBI Fabric | No | No | No | No | No test | Backups showed no flow; Core flowed |
| 13 | PFP-C core/ PBI Backups | No | No | No | No | No test | PBI showed limited flow, center did not flow well |
| 14 | PFP-C Core/ PBI Backups | No | — | — | 24 Hrs. | 24 Hrs. with no leaks | PBI and PFP-C showed a lot of flow |
| 15 | Oversized PFP-D Core/PBI Backups | No | Yes[3] | — | 48 Hrs. | Slow leak over 48 Hr. period | PBI and PFP-D showed a lot of flow |
| 16 | PFP-B Core/ PBI Backups | No | Yes[3] | — | 48 Hrs. | Ran 48 hrs with no leakage - | PFP-B center flowed good, PBI showed some flow; failure due to |

TABLE 1-continued

SIMULATED STEAM (650° F.) TESTS ON BOP SEAL MATERIALS

| TEST NUMBER | SEAL MATERIALS[4] | COLD SEAL AT °F. 75 | 250 | 300 | STEAM SOAK ON OPEN SEALS | SEAL AT 650° F. (STEAM) | CONDITION OF SEALS AFTER TEST |
|---|---|---|---|---|---|---|---|
|  |  |  |  |  |  | failed at 48 hrs | extrusion at ends next to polished rod |
| 17 | PFP-B Core/ PBI-C Backups | No | No | — | 48 Hrs. | Ran 48 hrs with no leakage - failed at 48 hrs | PFP-B center showed only small flow, PBI-C cracked. Failure due to extrusion at ends next to polished rod |
| 18 | PFP-B Core/ PBI-D Backups | No | No | — | — | Test discontinued due to equipment failure |  |

[1]Parts had small cracks in center when received
[2]Slow leak
[3]At 200° F.
[4]PBI is virgin poly-2,2' (m-phenylene)-5,5'bibenzimidazole.
PBI-A is a PBI molded under milder conditions.
PBI-B is a PBI molded at lower pressure and lower temperature and then molded article was heat treated in presence of air.
PBI-C is PBI with 30 wt. % glass fiber of about ¼" length.
PBI-D is a blend of PBI, a fluorinated synthetic elastomer, and high modulus carbon fibers.
PFP-A is polytetrafluoroethylene.
PFP-B is a blend of about 60 wt. % of a copolymer of tetrafluoroethylene and a perfluorinated vinyl ether and about 40 wt. % of PBI in the form of PBI powder and PBI fibers.
PFP-C is a blend of about 60 wt. % of a copolymer of tetrafluoroethylene and a perfluorinated vinyl ether with about 40 wt. % of fillers comprising PBI powder, PBI fibers, carbon fibers, and metallic fillers.
PFP-D is a blend of about 60 wt. % of a copolymer of tetrafluoroethylene and a perfluorinated vinyl ether with about 40 wt. % of fillers comprising PBI powder, PBI fibers and mineral fillers.
CG is compressed graphite.

The virgin poly-2,2'-(m-phenylene)-5,5-bibenzimidazole element had a very high modulus and could not be deflected at 73° F. to effect a "cold seal"; therefore no 650° F. steam test were run. Compressed graphite core with polybenzimidazole outer backup seals showed unreliable cold and 650° F. steam tests, but one of these two-component seals did run for 168 hours in steam with no leakage. However, the compressed graphite is only good for one cycle since pressure-temperature densifies this material and increases the modulus to the point that subsequent flow is not possible.

The polybenzimidazole elements appeared to be plasticized by 650° F. steam when the seal elements were held in the open, exposed position for 48 hours prior to closing. The polybenzimidazole tips in contact with the polished rod showed heavy extrusion into the clearance gap. However, the polybenzimidazole on the edges and rear of the seal element which were protected from steam showed only minor softening and extrusion.

EXAMPLE III

A series of blowout preventer ram seals were evaluated under field condition in a oil field which was being steam treated to enhance oil production. Each of wells W1 through W5 were provided with a blowout preventer of the type illustrated in FIG. 1, differing only as to the construction of the ram seals. The two ram seals in each blowout preventer were identical to each other. Steam was then injected through the open blowout preventer and the well casing into the oil bearing subterranean formation for a first period of time, after which steam injection was discontinued and the steamed formation was permitted to "steam-soak". Then the well was placed on production for a third period of time. The blowout preventers, which were normally in the open position, were occasionally manually actuated to the closed position and observations were made as to the effectiveness of the blowout preventer seals. The types of ram seal construction tested were as follows:

| Seal Type | Description of Each Ram Seal Structure |
|---|---|
| A1 | A unitary article sinter molded from a virgin polybenzimidazole having an ASTM D695 compressive modulus of elasticity of about 900,000 psi at room temperature, about 500,000 psi at 550° F. and about 350,000 psi at 650° F., a coefficient of linear thermal expansion of about $13 \times 10^{-6}$ in/in/°F. for the temperature range of 75 to 300° F. and $18 \times 10^{-6}$ in/in/°F. for the temperature range of 390 to 570° F., a Shore D hardness of about 99 and a Rockwell A hardness in the range of 55 to 65. |
| A2 | Four components as shown in FIGS. 2-7. Each of the three backup elements 61, 62 and 64 was sinter molded from the same polybenzimidazole resin as in A1 to which had been added 15 wt. % sulfonated fibers of polybenzimidazole, with the length of the fibers being in the range of 1/32 to ¼ inch. These elements had a Rockwell B hardness of 90. The core element 63 was molded from a perfluorocarbon elastomer copolymer of tetrafluoroethylene and perfluoroalkyl vinyl ether having an ASTM D695 compressive modulus of elasticity of about 180,000 psi at room temperature, a coefficient of linear thermal expansion of about $8 \times 10^{-5}$ in/in/°F. for the temperature range of 75 to 300° F. and about $10 \times 10^{-5}$ in/in/°F. for the temperature range of 300 to 400° F., and a Shore D hardness in the range of 50 to 80. |
| A3 | Four components, as shown in FIGS. 2-7. Each of the three backup elements 61, 62 and 64 was sinter molded from the same polybenzimidazole resin as in A1 to which had been added 30 wt. % E-glass fibers having a length in the range of 1/32 to ¼ inch. The backup elements had an ASTM D695 compressive modulus of elasicity of about 1,250,000 psi at room temperature, a coefficient of linear thermal expansion of about $13.6 \times 10^{-6}$ in/in/°F. for the range of 75-300° F. and $12.4 \times 10^{-6}$ in/in/°F. for the range of 390-570° F., and a Rockwell A hardness in the |

| Seal Type | Description of Each Ram Seal Structure |
|---|---|
| | range of about 55 to about 65. The core element 63 was the same material as the A2 core element |
| A4 | Four components, as shown in FIGS. 2–7. Each of the three backup element 61, 62 and 63 was sinter molded from a mixture of polybenzimidazole, a copolymer of tetrafluoroethylene and a perfluorinated vinyl ether, high modulus carbon fibers having a length in the range of 1/32" to ¼" and a diameter of about 140 microns, and sulfonated polybenzimidazole fibers of 1.5 denier per filament having a length in the range of 1/32" to ¼". The core element 63 was of the same material as the A2 core element. |
| A5 | A unitary article formed from polytetrafluoroethylene containing glass fibers. | curred along both the top and bottom edges of each A5 seal. One A5 seal showed some loss of material from one side due to erosion and flaking.

The initial examination of type A2, A3 and A4 seals on removal from the blowout preventers in the field indicated that extrusion of the backup material had occurred on the three seals. While the amount of this extrusion varied with the seal, on all three the extrusion of the top backup element was more pronounced. In all three seals differential amounts of extrusion produced a distinct angle across the sealing face.

Comparison of the after test dimensions with pretest as molded dimensions confirmed that changes in the size of both top and bottom backups and core had taken place. Increases in both length and thickness were indicated. The magnitude of these changes was as follows:

TABLE 3

CHANGES IN BACKUP ELEMENTS

| TYPE | PRETRIAL DIMENSIONS | | AFTER TRIAL DIMENSIONS | | DIFFERENCES | |
|---|---|---|---|---|---|---|
| | | | TOP | BOTTOM | TOP | BOTTOM |
| A2 | Overall Length | 3.156 | 3.294 | 3.2/3.209 | 0.138 | 0.044/0.053 |
| | Thickness | 0.250 | 0.258 | 0.259 | 0.008 | 0.009 |
| | Base OD | 3.505 | 3.459 | 3.463 | −0.046 | −0.042 |
| | Base Thickness | 0.187 | 0.272/0.269 | 0.243/0.277 | 0.085/0.082 | 0.56/0.090 |
| A3 | Over Length | 3.156 | 3.191/3.22 | 3.155 | 0.35/0.64 | −0.001 |
| | Thickness | 0.250 | 0.267 | 0.268 | 0.017 | 0.018 |
| | Base OD | 3.505 | 3.456 | 3.439 | −0.041 | −0.066 |
| | Base Thickness | 0.187 | 0.285 | 0.272 | 0.098 | 0.085 |
| A4 | Overall Length | 3.156 | 3.174/3.158 | 3.132/3.142 | 0.018/0.002 | −0.024/−0.014 |
| | Thickness | 0.250 | 0.251 | 0.257 | 0.001 | 0.007 |
| | Base OD | 3.505 | 3.44 | 3.442 | −0.11 | −0.063 |
| | Base Thickness | 0.187 | 0.255 | 0.245 | 0.68 | 0.058 |

From the above Table 3 all three seals showed an increase in thickness and length, with the greatest length increases taking place in top backup. For all a

TABLE 2

OBSERVATIONS

| EVENT | A1 | A2 | A3 | A4 | A5 |
|---|---|---|---|---|---|
| ON STEAM, 1ST TEST READING | RAMS LEAKED NOT HOLDING ANY PRESSURE | NO LEAK, EASY TO TURN | SLIGHT LEAK | NO LEAK, EASY TO TURN | NOT TESTED |
| ON STEAM 2ND TEST READING | RAMS DID NOT HOLD | RAMS LEAKING | SMALL LEAK | SLIGHT LEAK | SMALL LEAK |
| ON STEAM 3RD TEST READING | RAMS LEAKED | RAMS LEAKED, EASY TO TURN | RAMS HELD, NO LEAK, EASY TO TURN | SLIGHT LEAK, LEAK STOPPED ON TIGHTENING RAMS | RAMS LEAKED |
| WELL FLOWING WITHOUT PUMPING | DID NOT HOLD, HARD TO TURN | LEAKED | RAMS LEAKING A LITTLE | RAMS HELD, EASY OPEN AND CLOSE | LEAKED AS IF NOTHING THERE |
| PUMPING 1ST TEST READING | LEAKED | LEAKED A LITTLE | A LITTLE LEAKAGE | HELD OK | LEAKED |
| PUMPING 2ND TEST READING | VIGOROUS LEAK | VIGOROUS LEAK | SLIGHT LEAK, OPERATES SMOOTHLY | TINY LEAK | LEAKING |
| PUMPING 3RD TEST READING | SLIGHT LEAK | LEAKED | SEALED, NO LEAK | LEAKED | NO PRODUCTION |

Seal type A1 was manufactured from 100% virgin unfilled PBI. The lack of sealability of this material is attributed to the high forces required to overcome the high modulus of the material; these forces are not present during the normal closing of the BOP rams. Therefore, 100% virgin unfilled molded PBI was considered to be unsuitable for use in a unitary, single composition BOP sealing application.

Extrusion of the type A5 reinforced polytetrafluoroethylene seals was visible on the flat sealing faces on either side of the polish rod area. Extrusion had ocdecrease in base diameter is indicated. The measurements indicate that some swelling along with differential extrusion of the backups had taken place in service.

While overall increase in size of the backups is indicated, a slight reduction in length, thickness and diameter of the cores is indicated. Only the one core from the A2 seal showed an increase in length with the other dimensions posting a decrease. Actual measured dimensions and differences are summarized in the following Table 4:

TABLE 4

| TYPE | | PRETRIAL DIMENSIONS | CHANGES IN CORE ELEMENTS AFTER TRIAL DIMENSION | DIFFERENCE |
|---|---|---|---|---|
| A2 | Overall Length | 3.656 | 3.66 | −0.016 |
| | Base Diameter | 3.530 | 3.494 | −0.036 |
| | Thickness | 0.500 | 0.476 | −0.23 |
| A3 | Overall Length | 3.656 | 3.548/3.538 | −0.108/−0.118 |
| | Base Diameter | 3.530 | 3.480 | −0.050 |
| | Thickness | 0.500 | 0.471 | −0.029 |
| A4 | Overall Length | 3.656 | 3.597/3.61 | −0.059/−0.046 |
| | Base Diameter | 3.530 | 3.461 | −0.092 |
| | Thickness | 0.500 | 0.478 | −0.022 |

One of the prime purposes of the field trial was to gather information on the high temperature stability of the resinous composite materials. While some extrusion and swelling of the resinous composite materials took place, initial observations indicated no chemical breakdown of any the materials blends had taken place TGA analyses were run on samples taken from the A2, A3 and A4 type seals. Comparison of these TGA traces with available data indicated that no significant changes in the chemical composition of the materials had taken place during the field trials.

While the A2 core contained an erosion channel cut on one side and a stress crack, the sealing faces of the center cores of the A3 and A4 type seals were in remarkably good condition. While some dimensional change had taken place, sealing faces were undamaged with the original "as molded" chamfer lines still visible.

No significant degradation of the material with resultant loss of physical properties was indicated. However, swelling and extrusion of both the backup and core materials took place in a differential manner resulting in the greatest amount of extrusion occurring in the top backup element in all cases. Some extrusion is desirable in order to compensate for shifting of the sealing faces. In conjunction with this differential extrusion of the backup elements some lifting or tilting of the rams took place under pressure. This was indicated by the taper or angle formed across the sealing faces. Due to the occurrence of these phenomena it was concluded that the backups contributed to the formation of the pressure retention seal in all three seal types during the field trials.

While the invention has been described in terms of a seal for a blowout preventer, it has application for other types of well head seals, for example, a stuffing box seal wherein two C-shaped seal elements are placed in abutting relationship to plug off the annulus between a pipe and a coaxially positioned pump rod, each C-shaped seal element comprises at least three layers with the upper and lower layers being formed of the high temperature seal material, and an intermediate layer being formed of the lower temperature seal material. The C-shaped seal elements can be subjected to pressure parallel to the longitudinal axis of the rod rather than perpendicular to the longitudinal axis, as in the case of the blowout preventer. The invention can be employed in various types of wells, for example, geothermal wells, oil wells, steam injection wells, wells for hydraulic milling, and the like.

Reasonable variations and modifications are possible within the scope of the foregoing description and the appended claims to the invention.

We claim:

1. A seal structure suitable for use with high pressure and elevated temperatures which comprises:

first and second spaced apart high temperature seal layers for providing effective sealing action at elevated temperatures, a lower temperature seal layer for providing effective sealing action at temperatures below said elevated temperatures, said lower temperature seal layer being positioned between said first and second high temperature seal layers;

each of said first and second high temperature seal layers having a compressive modulus of elasticity at 72° F. (ASTM D 695-85) in the range of about 500,000 psi to about 2,500,000 psi, a coefficient of linear thermal expansion in the range of about $10 \times 10^{-6}$ in/in/°F. to about $20 \times 10^{-6}$ in/in/°F. for the temperature range of 75° to 300° F., and a Rockwell A hardness in the range of about 55 to about 65; and said lower temperature seal having a compressive modulus of elasticity at 72° F. (ASTM D 695-85) in the range of about 25,000 psi to about 250,000 psi, a coefficient of linear thermal expansion in the range of about $5 \times 10^{-5}$ to about $10 \times 10^{-5}$ in/in°F. for the temperature range of 75° to 300° F., and a Shore D hardness in the range of about 50 to about 65.

2. A seal structure in accordance with claim 1, wherein each of said first and second high temperature seal layers has a compressive modulus of elasticity of at least 180,000 psi at 550° F. and at least 100,000 psi at 650° F.

3. A seal structure in accordance with claim 2, wherein said compressive modulus of elasticity of said first and second high temperature seal layers at 72° F. is in the range of about 600,000 to about 1,100,000 psi.

4. A seal structure in accordance with claim 3, wherein the coefficient of linear thermal expansion of said first and second high temperature seal layers is in the range of about $10 \times 10^{-6}$ to about $25 \times 10^{-6}$ in/in/°F. for the temperature range of 390° to 570° F.

5. A seal structure in accordance with claim 4, wherein said compressive modulus of elasticity of said lower temperature seal layer is in the range of about 100,000 psi to about 200,000 psi.

6. A seal structure in accordance with claim 5, wherein the coefficient of linear thermal expansion for said lower temperature seal layer is in the range of about $7 \times 10^{-5}$ to about $12 \times 10^{-5}$ in/in/°F. for the temperature range of 300° to 400° F.

7. A seal structure in accordance with claim 6, wherein at least 40 wt. % of each of said first and second high temperature seal layers is polybenzimidazole.

8. A seal structure in accordance with claim 7, wherein said lower temperature seal layer comprises at least one material selected from the group consisting of thermoplastic polymers of fluorinated hydrocarbons and fluorinated synthetic elastomers.

9. A seal structure in accordance with claim 7, wherein said lower temperature seal layer comprises a synthetic elastomeric fluorocarbon.

10. A seal structure in accordance with claim 7, wherein said lower temperature seal layer comprises an elastomeric copolymer of at least two monomers selected from the group consisting of fluorinated olefinic hydrocarbons having 2 to 10 carbon atoms per molecule and fluorinated alkyl vinyl ethers having 3 to 10 carbon atoms per molecule.

11. A seal structure in accordance with claim 10, wherein each of said first and second high temperature seal layers contains from about 15 to about 50 wt. % fibers selected from the group consisting of fibers of E glass having a length in the range of about 1/32" to about ¼" and being at least substantially free of any finish or sizing agents, carbon fibers with a tensile modulus in the range of about 20 million to about 60 million psi and a length in the range of about 1/32" to about ¼", sulfonated polybenzimidazole fibers having a length in the range of about 1/32" to about ¼", and aramid fibers having a length in the range of about 1/32" to about ¼".

12. A seal structure in accordance with claim 11, wherein said lower temperature seal layer comprises:
    about 50 to 100 wt. % said elastomeric copolymer,
    0 to about 50 wt. % polybenzimidazole,
    0 to about 50 wt. % fibers selected from the group consisting of E glass fibers, carbon fibers, and aramid fibers,
    0 to about 10 wt. % mineral fillers, and
    0 to about 10 wt. % thermal stabilizers.

13. A seal structure in accordance with claim 10, wherein each of said first and second high temperature seal layers contains from about 15 to about 50 wt. % fibers of E glass having a length in the range of about 1/32" to about ¼", and a diameter in the range of about 50 to about 300 microns, and being at least substantially free of any finish or sizing agents.

14. A seal structure in accordance with claim 13, wherein said lower temperature seal layer comprises:
    about 50 to about 95 wt. % said elastomeric copolymer,
    about 5 to about 50 wt. % of polybenzimidazole,
    0 to about 35 wt. % fibers selected from the group consisting of E glass fibers, carbon fibers, and aramid fibers,
    about 0.01 to about 5 wt. % mineral fillers, and
    about 0.01 to about 5 wt. % thermal stabilizers.

15. A seal structure in accordance with claim 1, wherein each of said first and second high temperature seal layers comprises at least 50 wt. % polybenzimidazole and from about 15 to about 50 wt. % fibers selected from the group consisting of fibers of E glass having a length in the range of about 1/32" to about ¼" and being at least substantially free of any finish or sizing agents, carbon fibers with a tensile modulus in the range of about 20 million to about 60 million psi and a length in the range of about 1/32" to about ¼", sulfonated polybenzimidazole fibers having a length in the range of about 1/32" to about ¼", and aramid fibers having a length in the range of about 1/32" to about ¼".

16. A seal structure in accordance with claim 15, wherein each of said lower temperature seal layer comprises:
    about 50 to 100 wt. % elastomeric copolymer of at least two monomers selected from the group consisting of fluorinated olefinic hydrocarbons having 2 to 10 carbon atoms per molecule and fluorinated alkyl vinyl ethers having 3 to 10 carbon atoms per molecule,
    0 to about 50 wt. % polybenzimidazole,
    0 to about 50 wt. % fibers selected from the group consisting of E glass fibers, carbon fibers, and aramid fibers,
    0 to about 10 wt. % mineral fillers, and
    0 to about 10 wt. % thermal stabilizers.

17. A seal structure in accordance with claim 2, wherein each of said first and second high temperature seal layers comprises at least 50 wt. % polybenzimidazole and from about 15 to about 50 wt. % fibers selected from the group consisting of fibers of E glass having a length in the range of about 1/32" to about ¼" and being at least substantially free of any finish or sizing agents, carbon fibers with a tensile modulus in the range of about 20 million to about 60 million psi and a length in the range of about 1/32" to about ¼", sulfonated polybenzimidazole fibers having a length in the range of about 1/32" to about ¼", and aramid fibers having a length in the range of about 1/32" to about ¼".

18. A seal structure in accordance with claim 17, wherein said lower temperature seal layer comprises:
    about 50 to about 95 wt. % elastomeric copolymer of at least two monomers selected from the group consisting of fluorinated olefinic hydrocarbons having 2 to 10 carbon atoms per molecule and fluorinated alkyl vinyl ethers having 3 to 10 carbon atoms per molecule,
    about 5 to about 50 wt. % polybenzimidazole,
    0 to about 35 wt. % fibers selected from the group consisting of E glass fibers, carbon fibers, and aramid fibers,
    about 0.01 to about 5 wt. % mineral fillers, and
    about 0.01 to about 5 wt. % thermal stabilizers.

19. A seal structure in accordance with claim 1, wherein each of said first and second high temperature seal layers has a first leg which is at least generally parallel to the longitudinal axis of the seal structure, a second leg which is at least generally perpendicular to said longitudinal axis, and an intermediate portion connected between the respective first and second legs; and wherein said lower temperature seal layer has a first portion, extending along said longitudinal axis at least generally parallel to the first legs, and a second portion which extends at least generally perpendicularly to said longitudinal axis to form a T.

20. A seal structure in accordance with claim 19, wherein each said intermediate portion has at least generally the curvature of a cylinder which is tangent to each of the respective first and second legs.

21. A seal structure in accordance with claim 20, wherein said lower temperature seal layer contacts said first and second high temperature seal layers throughout their length, and wherein said seal structure is at least generally in the form of a portion of a cylinder.

22. A seal structure in accordance with claim 21, further comprising a discoidal layer extending at least substantially perpendicularly to said longitudinal axis, said discoidal layer being in contact with said second portion of said lower temperature seal layer, said discoidal layer having a compressive modulus of elasticity at 72° F. (ASTM D695-85) in the range of about 500,000 psi to about 2,500,000 psi, a coefficient of linear thermal expansion in the range of about $10 \times 10^{-6}$ in/in°F. to about $20 \times 10^{-6}$ in/in/°F. for the temperature range of 75° to about 300° F.

23. A ram seal unit comprising:

first and second spaced apart high temperature seal layers for providing effective sealing action at elevated temperatures, a lower temperature seal layer for providing effective sealing action at temperatures below said elevated temperatures, said lower temperature seal layer being positioned between said first and second high temperature seal layers; said lower temperature seal layer and said first and second high temperature seal layers forming a seal structure which is at least generally in the form of a portion of a cylinder;

each of said first and second high temperature seal layers having a compressive modulus of elasticity at 72° F. (ASTM D 695-85) in the range of about 500,000 psi to about 2,500,000 psi, a coefficient of linear thermal expansion in the range of about $10 \times 10^{-6}$ in/in/°F. to about $20 \times 10^{-6}$ in/in/°F. for the temperature range of 75° to 300° F., and a Rockwell A hardness in the range of about 55 to about 65;

said lower temperature seal having a compressive modulus of elasticity at 72° F. (ASTM D 695-85) in the range of about 25,000 psi to about 250,000 psi, a coefficient of linear thermal expansion in the range of about $5 \times 10^{-5}$ to about $10 \times 10^{-5}$ in/in°F. for the temperature range of 75° to 300° F., and a Shore D hardness in the range of about 50 to about 65;

wherein each of said first and second high temperature seal layers has a first leg which is at least generally parallel to the longitudinal axis of the seal structure, a second leg which is at least generally perpendicular to said longitudinal axis, and an intermediate portion connected between the respective first and second legs; each said intermediate portion having at least generally the curvature of a cylinder which is tangent to each of the respective first and second legs;

wherein said lower temperature seal layer has a first portion, extending along said longitudinal axis at least generally parallel to the first legs, and a second portion which extends at least generally perpendicularly to said longitudinal axis to form a T;

a discoidal layer extending at least substantially perpendicularly to said longitudinal axis, said discoidal layer being adjacent to said second portion of said lower temperature seal layer, said discoidal layer having a compressive modulus of elasticity at 72° F. (ASTM D695-85) in the range of about 500,000 psi to about 2,500,000 psi, a coefficient of linear thermal expansion in the range of about $10 \times 10^{-6}$ in/in/°F. to about $20 \times 10^{-6}$ in/in/°F. for the temperature range of 75° to 300° F.; and first and second metal retainers which mate with the outer surface of the respective high temperature seal layer to form a solid cylinder.

24. A ram seal unit in accordance with claim 23, further comprising a metal cylindrical end plate, and means for securing together said end plate, said seal structure, said discoidal layer, and said first and second retainers.

25. A ram seal unit in accordance with claim 24, wherein the end of said ram seal unit opposite said end plate constitutes the sealing face and has a groove therein extending along a line perpendicular to said first legs and through said longitudinal axis, said groove being in the shape of a half cylinder.

26. A ram seal in accordance with claim 25, wherein said second portion of said lower temperature seal layer extends radially outwardly from said longitudinal axis further than said second legs, said discoidal layer, said retainers and said end plate.

27. A ram seal unit in accordance with claim 26, wherein the sealing face portion of said first portion of said lower temperature seal layer extends axially outwardly from the sealing face portions of said first legs and said retainers.

28. A ram seal in accordance with claim 27, wherein each of said first and second high temperature layers and said discoidal layer comprises at least 50 wt. % polybenzimidazole and from about 15 to about 50 wt. % fibers selected from the group consisting of fibers of E glass having a length in the range of about 1/32" to about ¼" and being at least substantially free of any finish or sizing agents, carbon fibers with a tensile modulus in the range of about 20 million to about 60 million psi and a length in the range of about 1/32" to about ¼", sulfonated polybenzimidazole fibers having a length in the range of about 1/32" to about ¼", and aramid fibers having a length in the range of about 1/32" to about ¼".

29. A ram seal unit in accordance with claim 28, wherein each of said lower temperature seal layer comprises:

about 50 to 100 wt. % copolymer of at least two monomers selected from the group consisting of fluorinated olefinic hydrocarbons having 2 to 10 carbon atoms per molecule and fluorinated alkyl vinyl ethers having 3 to 10 carbon atoms per molecule, 0 to about 50 wt. % polybenzimidazole, 0 to about 50 wt. % fibers selected from the group consisting of E glass fibers, high modulus carbon fibers, and aramid fibers, 0 to about 10 wt. % mineral fillers, and 0 to about 10 wt. % thermal stabilizers.

30. A ram seal unit in accordance with claim 27, wherein each of said first and second high temperature layers and said discoidal layer comprises at least 50 wt. % polybenzimidazole and from about 15 to about 50 wt. % fibers of E glass having a length in the range of about 1/32" to about ¼" and a diameter in the range of about 50 to about 300 microns, and being at least substantially free of any finish or sizing points.

31. A ram seal unit in accordance with claim 30, wherein said lower temperature seal layer comprises:

about 50 to about 95 wt. % elastomeric copolymer of at least two monomers selected from the group consisting of fluorinated olefinic hydrocarbons having 2 to 10 carbon atoms per molecule and fluorinated alkyl vinyl ethers having 3 to 10 carbon atoms per molecule, about 5 to about 50 wt. % polybenzimidazole, 0 to about 35 wt. % fibers selected from the group consisting of E glass fibers and carbon fibers, about 0.1 to about 5 wt. % mineral fillers, and about 0.1 to about 5 wt. % thermal stabilizers.

32. A ram seal unit comprising:

first and second spaced apart high temperature seal layers for providing effective sealing action at elevated temperatures, a lower temperature seal layer for providing effective sealing action at temperatures below said elevated temperatures, said lower temperature seal layer being positioned between said first and second high temperature seal layers; said lower temperature seal layer and said first and second high temperature seal layers forming a seal structure which is at least generally in the form of a portion of a cylinder;

each of said first and second high temperature seal layers having a compressive modulus of elasticity at 72° F. (ASTM D 695-85) in the range of about 500,000 psi to about 2,500,000 psi, a coefficient of linear thermal expansion in the range of about $10 \times 10^{-6}$ in/in/°F. to about $20 \times 10^{-6}$ in/in/°F. for the temperature range of 75° to 300° F., and a Rockwell A hardness in the range of about 55 to about 65;

said lower temperature seal having a compressive modulus of elasticity at 72° F. (ASTM D 695-85) in the range of about 25,000 psi to about 250,000 psi, a coefficient of linear thermal expansion in the range of about $5 \times 10^{-5}$ to about $10 \times 10^{-5}$ in/in°F. for the temperature range of 75° to 300° F., and a Shore D hardness in the range of about 50 to about 65; and first and second retainers which mate with the outer surface of the respective high temperature seal layer to form a solid cylinder.

33. A ram seal unit in accordance with claim 32, further comprising a cylindrical end plate, and means for securing together said end plate, said seal structure, and said first and second retainers.

34. A blowout preventer having a cross shaped housing formed by first and second tubular members joined at right angles to each other, said first tubular member being adapted to internally receive a coaxially positioned cylindrical element to form an annulus therebetween, first and second ram seal units, each of said first and second ram seal units having a sealing face with a groove therein which corresponds to the curvature of said cylindrical element, said first and second ram seal units being positioned in said second tubular member on either side of said first tubular member such that the groove in each ram seal unit can mate with the cylindrical element in said first tubular element to seal said annulus, and means for effecting motion of said first and second ram seal units relative to each other in said second tubular member; each of said first and second ram seal units comprising:

first and second spaced apart high temperature seal layers for providing effective sealing action at elevated temperatures, a lower temperature seal layer for providing effective sealing action at temperatures below said elevated temperatures, said lower temperature seal layer being positioned between said first and second high temperature seal layers; said lower temperature seal layer and said first and second high temperature seal layers forming a seal structure which is at least generally in the form of a portion of a cylinder;

each of said first and second high temperature seal layers having a compressive modulus of elasticity at 72° F. (ASTM D 695-85) in the range of about 500,000 psi to about 2,500,000 psi, a coefficient of linear thermal expansion in the range of about $10 \times 10^{-6}$ in/in/°F. to about $20 \times 10^{-6}$ in/in/°F. for the temperature range of 75° to 300° F., and a Rockwell A hardness in the range of about 55 to about 65;

the lower temperature seal layer having a compressive modulus of elasticity at 72° F. (ASTM D 695-85) in the range of about 25,000 psi to about 250,000 psi, a coefficient of linear thermal expansion in the range of about $5 \times 10^{-5}$ to about $10 \times 10^{-5}$ in/in°F. for the temperature range of 75° to 300° F., and a Shore D hardness in the range of about 50 to about 65; and first and second metal retainers which mate with the outer surface of the respective high temperature seal layer to form a solid cylinder.

35. A blowout preventer having a cross shaped housing formed by first and second tubular members joined at right angles to each other, said first tubular member being adapted to internally receive a coaxially positioned cylindrical element to form an annulus therebetween, first and second ram seal units, each of said first and second ram seal units having a sealing face with a groove therein which corresponds to the curvature of said cylindrical element, said first and second ram seal units being positioned in said second tubular member on either side of said first tubular member such that the groove in each ram seal unit can mate with the cylindrical element in said first tubular element to seal said annulus, and means for effecting motion of said first and second ram seal units relative to each other in said second tubular member; each of said first and second ram seal units comprising:

first and second spaced apart high temperature seal layers for providing effective sealing action at elevated temperatures, a lower temperature seal layer for providing effective sealing action at temperatures below said elevated temperatures, said lower temperature seal layer being positioned between said first and second high temperature seal layers; said lower temperature seal layer and the first and second high temperature seal layers forming a seal structure which is at least generally in the form of a portion of a cylinder;

each of said first and second high temperature seal layers having a compressive modulus of elasticity at 72° F. (ASTM D 695-85) in the range of about 500,000 psi to about 2,500,000 psi, a coefficient of linear thermal expansion in the range of about $10 \times 10^{-6}$ in/in/°F. to about $20 \times 10^{-6}$ in/in/°F. for the temperature range of 75° to 300° F., and a Rockwell A hardness in the range of about 55 to about 65;

the lower temperature seal layer having a compressive modulus of elasticity at 72° F. (ASTM D 695-85) in the range of about 25,000 psi to about 250,000 psi, a coefficient of linear thermal expansion in the range of about $5 \times 10^{-5}$ to about $10 \times 10^{-5}$ in/in°F. for the temperature range of 75° to 300° F., and a Shore D hardness in the range of about 50 to about 65; and wherein each of the first and second high temperature seal layers has a first leg which is at least generally parallel to the longitudinal axis of the seal structure, a second leg which is at least generally perpendicular to said longitudinal axis, and an intermediate portion connected between the respective first and second legs; each aid intermediate portion having at least generally the curvature of a cylinder which is tangent to each of the respective first and second legs;

wherein the lower temperature seal layer has a first portion, extending along said longitudinal axis at least generally parallel to the first legs, and a second portion which extends at least generally perpendicularly to said longitudinal axis to form a T;

a discoidal layer extending at least substantially perpendicularly to said longitudinal axis, said discoidal layer being adjacent to said second portion of said lower temperature seal layer, said discoidal layer having a compressive modulus of elasticity at 72° F. (ASTM D695-85) in the range of about 500,000 psi to about 2,500,000 psi, a coefficient of linear thermal expansion in the range of about $10 \times 10^{-6}$ in/in/°F. to about $20 \times 10^{-6}$ in/in/°F. for the temperature range of 75° to 300° F.;

first and second metal retainers which mate with the outer surface of the respective high temperature seal layer to form a solid cylinder;

a metal cylindrical end plate; and means for securing together said end plate, said seal structure, said discoidal layer, and said first and second retainers to form the respective ram seal unit;

wherein the end of each ram seal unit opposite its end plate constitutes its sealing face, and wherein the groove therein extends along a line perpendicular to said first legs and through said longitudinal axis, said groove being in the shape of a half cylinder.

36. A blowout preventer having a cross shaped housing formed by first and second tubular members joined at right angles to each other, said first tubular member being adapted to internally receive a coaxially positioned cylindrical element to form an annulus therebetween, first and second ram seal units, each of said first and second ram seal units having a sealing face with a groove therein which corresponds to the curvature of said cylindrical element, said first and second ram seal units being positioned in said second tubular member on either side of said first tubular member such that the groove in each ram seal unit can mate with the cylindrical element in said first tubular element to seal said annulus, and means for effecting motion of said first and second ram seal units relative to each other in said second tubular member; each of said first and second ram seal units comprising:

first and second spaced apart high temperature seal layers for providing effective sealing action at elevated temperatures, a lower temperature seal layer for providing effective sealing action at temperatures below said elevated temperatures, said lower temperature seal layer being positioned between said first and second high temperature seal layers and in contact with the first and second high temperature seal layers throughout their length; the lower temperature seal layer and the first and second high temperature seal layers forming a seal structure which is at least generally in the form of a portion of a cylinder;

each of said first and second high temperature seal layers having a compressive modulus of elasticity at 72° F. (ASTM D 695-85) in the range of about 500,000 psi to about 2,500,000 psi, a coefficient of linear thermal expansion in the range of about $10 \times 10^{-6}$ in/in/°F. to about $20 \times 10^{-6}$ in/in/°F. for the temperature range of 75° to 300° F., and a Rockwell A hardness in the range of about 55 to about 65;

the lower temperature seal layer having a compressive modulus of elasticity at 72° F. (ASTM D 695-85) in the range of about 25,000 psi to about 250,000 psi, a coefficient of linear thermal expansion in the range of about $5 \times 10^{-5}$ to about $10 \times 10^{-5}$ in/in°F. for the temperature range of 75° to 300° F., and a Shore D hardness in the range of about 50 to about 65;

each of the first and second high temperature seal layers has a first leg which is at least generally parallel to the longitudinal axis of the seal structure, a second leg which is at least generally perpendicular to said longitudinal axis, and an intermediate portion connected between the respective first and second legs; each said intermediate portion having at least generally the curvature of a cylinder which is tangent to each of the respective first and second legs;

the lower temperature seal layer having a first portion, extending along said longitudinal axis at least generally parallel to the first legs, and a second portion which extends at least generally perpendicularly to said longitudinal axis to form a T;

a discoidal layer extending at least substantially perpendicularly to said longitudinal axis, said discoidal layer being adjacent to said second portion of said lower temperature seal layer, said discoidal layer having a compressive modulus of elasticity at 72° F. (ASTM D695-85) in the range of about 500,000 psi to about 2,500,000 psi, a coefficient of linear thermal expansion in the range of about $10 \times 10^{-6}$ in/in/°F. to about $20 \times 10^{-6}$ in/in/°F. for the temperature range of 75° to 300° F.;

each of the first and second high temperature layers and the discoidal layer comprising at least 50 wt. % polybenzimidazole and from about 15 to about 50 wt. % fibers of E glass having a length in the range of about 1/32" to about ¼" and a diameter in the range of about 50 to 300 microns, and being at least substantially free of any finish or sizing agents;

the lower temperature seal layer comprising:
 (a) about 50 to about 95 wt. % elastomeric copolymer of at least two monomers selected from the group consisting of fluorinated olefinic hydrocarbons having 2 to 10 carbon atoms per molecule and fluorinated alkyl vinyl ethers having 3 to 10 carbon atoms per molecule,
 (b) about 5 to about 50 wt. % polybenzimidazole,
 (c) 0 to about 35 wt. % fibers selected from the group consisting of E glass fibers and carbon fibers,
 (d) about 0.01 to about 5 wt. % mineral fillers, and
 (e) about 0.01 to about 5 wt. % thermal stabilizers;

first and second metal retainers which mate with the outer surface of the respective high temperature seal layer to form a solid cylinder;

a metal cylindrical end plate positioned adjacent the discoidal layer; and means for securing together said end plate, said discoidal layer, said seal structure and said first and second retainers to form the respective ram seal unit;

wherein the end of each ram seal unit opposite its end plate constitutes its sealing face, and wherein the groove therein extends along a line perpendicular to the respective first legs and through the respective longitudinal axis, each such groove being in the shape of a half cylinder;

wherein the second portion of each lower temperature seal layer extends radially outwardly from the respective longitudinal axis further than the respective second legs, discoidal layer, retainers and end plate; and wherein the sealing face portion of the first portion of the respective lower temperature seal layer extends axially outwardly from the sealing face portions of the respective first legs and retainers.

* * * * *

UNITED STATES PATENT AND TRADEMARK OFFICE
CERTIFICATE OF CORRECTION

Page 1 of 3

PATENT NO. : 4,986,511

DATED : January 22, 1991

INVENTOR(S) : Irby et al

It is certified that error appears in the above-identified patent and that said Letters Patent is hereby corrected as shown below:

Line 7 of Abstract, delete "of" and insert --or--.
Column 2, line 14, delete "7220 F." and insert --72°F.--.
Column 2, line 24, after "temperature" insert --range of 75 to--.
Column 6, line 39, delete "($CF_2$-$CF_2$), e.g fluoroethylene" and insert --$(CF_2$-$CF_2)$, e.g., polytetrafluoroethylene--.
Column 8, line 4, delete "mol" and insert --molecule,--.
Column 8, line 12, delete "($CF_2$-$CF_2$)" and insert --$(CF_2$-$CF_2)$--.
Column 12, line 11, after "pressure" delete "gauge in the pump conduit," and insert --below the blowout preventer was--.
Column 17, line 19, after "place" insert --.--.
Column 19, line 43, after "%" delete "of".
Column 19, line 63, after "wherein" delete "each of".
Column 19, line 65, after "50 to" insert --about--.
Column 21, line 21, after "seal" insert --layer--.
Column 22, line 1, after "seal" insert --unit--.
Column 22, line 11, after "seal" insert --unit--.
Column 22, line 25, after "wherein" delete "each of".
Column 22, line 27, after "50 to" insert --about--.

UNITED STATES PATENT AND TRADEMARK OFFICE
CERTIFICATE OF CORRECTION

PATENT NO. : 4,986,511
DATED : January 22, 1991
INVENTOR(S) : Irby et al

It is certified that error appears in the above-identified patent and that said Letters Patent is hereby corrected as shown below:

Column 22, line 46, delete "points" and insert --agents--.
Column 22, line 58, delete "0.1" and insert --0.01--.
Column 22, line 59, delete "0.1" and insert --0.01--.
Column 23, line 13, after "seal" insert --layer--.
Column 23, line 49, delete "said lower" and insert --the lower--.
Column 23, line 51, delete "said first" and insert --the first--.
Column 23, line 52, delete "said lower" and insert --the lower--.
Column 23, line 52, delete "said first" and insert --the first--.
Column 23, line 56, delete "said first" and insert --the first--.
Column 24, line 29, delete "said lower" and insert --the lower--.
Column 24, line 31, delete "said first" and insert --the first--.
Column 24, line 32, delete "said lower" and insert --the lower--.
Column 24, line 36, delete "said first" and insert --the first--.
Column 24, line 52, after "65;" delete "and".

UNITED STATES PATENT AND TRADEMARK OFFICE
CERTIFICATE OF CORRECTION

PATENT NO. : 4,986,511
DATED : January 22, 1991
INVENTOR(S) : Irby et al It is certified that error appears in the above-identified patent and that said Letters Patent is hereby corrected as shown below:

```
Column 24, line 60, delete "aid" and insert --said--.
Column 25, line 44, delete "said lower" and insert --the
     lower--.
Column 25, line 47, delete "said first" and insert --the
     first--.
Column 25, line 54, delete "said first" and insert --the
     first--.
Column 26, line 2, delete "has" and insert --having--.
Column 26, line 18, delete "adjacent to" and insert --in
     contact with--.
Column 26, line 31, after "50 to" insert --about--.
```

Signed and Sealed this

Tenth Day of November, 1992

Attest:

DOUGLAS B. COMER

*Attesting Officer*    *Acting Commissioner of Patents and Trademarks*